Patented Sept. 8, 1953

2,651,647

UNITED STATES PATENT OFFICE 2,651,647

PROCESS OF DEHYDRATION OF FATTY MATERIALS

Charles Greenfield, River Edge, N. J.

No Drawing. Application December 9, 1949, Serial No. 132,220

11 Claims. (Cl. 260—412.1)

This invention relates to the dehydration of fatty materials. In particular, this invention is directed to a novel process for the dehydration of fats and oils at temperatures which avoid destructive effects on valuable components of oils, and obviates the use or introduction of materials in effectuating the dehydration operation which frequently have to be removed or separated.

Fatty substances are generally isolated and removed from natural tissues by the following means:

(1) The natural fat-containing tissue or seeds are prepared for the extraction of fat by cooking, grinding (or both), and the fat expressed by screw press expeller or hydraulic methods, or (2) Water is added to the natural fat-containing substance after grinding, cooking (or both), and fat separated by stratification or centrifugation methods, or (3) Solvents such as hexane, trichlorethylene, alcohol, etc. are added to the natural fat-containing materials after preparation by grinding, cooking (or both), and contact made between the solvent and the natural fat-containing material to remove the fat from the tissue.

Since water is present in appreciable amounts in most natural substances, this water, the fat, and the emulsion-creating substances present in the original natural fat-containing tissues result in the formation of fat-water emulsions, thus creating difficult problems in the separation of the fatty substances from the natural material.

Heretofore water has been removed from natural materials by the use of rotary dryers, rotary drum dryers, rotary drum vacuum and vacuum pan dryers. As the tissues or seeds lose their moisture, they approach the solid state and the operation of further drying becomes increasingly complex due to problems of heat transfer and the subsequent elevation of the temperature of the material to a point considerably above that necessary to evaporate water. If care is exercised to prevent elevation of the temperature beyond a safe point, the duration of the operation is considerably lengthened. Where spray dryers are used the huge volumes of air necessary to effectuate the dehydration are often detrimental to delicate products subject to oxidation. The provision of an inert atmosphere for such an operation is usually very costly.

In one of its principal aspects, this invention is directed to the dehydration of fatty materials such as vitamin-containing oils derived from the livers of the cod and other fishes.

In another of its principal aspects, this invention is directed to the dehydration of the fatty materials of other natural oleaginous-containing products such as oil seeds and the like.

Accordingly, it is among the principal objectives of this invention to achieve a more efficacious dehydration of fats and oils than has heretofore been capable of accomplishment.

Another objective of this invention is to provide a highly improved method of removing oil from the native tissues or materials in which it is present.

Another objective of this invention is to suppress the emulsifying tendencies of emulsion-creating substances present in oils and mixed with water, and thereby to facilitate the dehydration thereof.

Another objective of this invention is to prevent the excessive hardening of non-fat solids from which oil is to be separated.

I have found that a fat liquid medium can be used as a heat transfer agent to remove moisture from natural fat-containing material—and if the operation is conducted under suitable vacuum in an appropriate vessel (provided with a heating jacket and stirring apparatus), the water is rapidly removed at a temperature which is markedly lower than that required in other drying methods. The fatty substances are extracted by the fat liquid medium and mutually form one solution. The difference in specific gravity between the insoluble residual non-fat solids and the whole body of fat after the dehydration thereof is such that the bulk of the fat and the solids readily separate. The mixture of solids and fat may be centrifuged for a more rapid separation or it may be separated by the screw press expeller method which is particularly suited for pre-dried seeds and tissues. Filtration may also be used as a means to achieve the separation. The dry solids-fat mixture either directly or after preliminary separation of the fat may be subjected to solvent extraction in order completely to remove the fat from the dried tissue. If the volatile solvent is then removed from the fat and solids, both products need no further drying.

The added fatty liquid medium may be a fat in the crude state since water will be removed both from the natural fat-containing substance and the added crude fat in the drying operation. Any solids present in the added crude fat will become a part of the solids of the natural fat-containing substance. The added fatty liquid medium may be the same kind of fat as that present in the natural fat-containing substance, or it may be another fat satisfactory for the operation. Natural tissues may thus be treated to recover the fat-soluble vitamin values or other important components thereof. The fat selected as the fatty liquid medium should be chosen with the viewpoint of securing suitable antioxidant values, taste, odor, etc. The natural fat-containing substance may be subjected to single-, multiple- or countercurrent extraction by the liquid fatty medium after the drying operation has been completed. The natural fat-containing substance should preferably be ground to a fine state in order to increase the velocity of the drying operation and achieve the mutual solubilization of the fat in the tissue and the added fatty liquid medium. The temperature of the liquid mixture should be the lowest possible necessary to achieve economical drying, or to achieve the highest quality products. The quantity of the added fatty liquid medium required, for example in batch operations, is readily determinable by the following equation:

$$\frac{\text{Fat in the original material+added fatty medium}}{\text{Dry non-fat solids}} = \frac{5 \text{ to } 8}{1}$$

Ratios as high as 10:1 and 20:1 may be used if continuous liquid drying techniques are preferred, such as long tube evaporation. The amount of the oil to be added will depend upon the desired fluidity of the mixture. Therefore, in some instances it may be desirable or advantageous to add even more oil so as to obtain ratios above 20:1. Lower limits are based strictly on the allowable temperature and rate of drying as well as on the nature of fats and solids and may be as low as 2:1. Preliminary drying of slurries may be advantageously done by the usual methods, and the fatty liquid medium added only when the moisture content has dropped to a point where further drying would be detrimental. The added fat may be liquid or solid at room temperature, but it is used in the liquid state in the course of the operation.

The fatty liquid medium may be any component of the natural fats obtained by fractionation or refining in accordance with appropriate methods. For example, the fatty liquid medium may be the free fatty acids obtained from natural fats or oils or high iodine fraction glycerides or low iodine fraction glycerides. The important feature is that the added fatty liquid medium may become an integral part of the dehydrated fat or oil which is the ultimate product sought.

I have found that the "emulsion creating substances" include many that are fatty in nature and among these are the phospholipids, sterols and in a lesser way the fatty acids (free), which occur naturally or are the breakdown products of natural processes. Quite often alkali agents such as soda ash, caustic soda, etc. are admixed with natural substances and these alkali agents react with the fatty acids forming soaps. These soaps may be considered emulsifying agents of synthetic variety and their effect may be neutralized by suitable means such as pH control. I prefer to apply this process to the natural substances that are considered fatty emulsion creating substances.

When the natural fat-containing materials are to be dehydrated as above described, the fatty emulsion-creating substances will prefer the fatty liquid medium rather than the non-fat solids. Upon separation of the fat from the solids, as by centrifugation methods or settling, a considerable fraction of the fatty emulsion-creating substance will be found in the fatty liquid. When repeated additions of fatty liquid medium, low in fatty emulsion-creating substances, are used for further "fat-extraction" of the solids, almost all of the fatty emulsion-creating substances will be extracted by the added liquid fatty medium, and the remaining fats adhering to the solids may be efficiently removed (by the methods practised in the older arts) without creating emulsions such as would be obtained if the fatty emulsion-creating substances were not removed. In this manner, almost complete removal of the fats from the natural fat-containing substances is possible. This entire process may be conducted without solvents which are often toxic and difficult to remove. Thus an effective partition of water, fat and solids may be obtained without the introduction of any chemical or chemical agent. My process, therefore, is of great value in handling natural fat-containing food materials.

As to the added fatty liquid medium, I prefer one that is low in fatty emulsion-creating substances, and, therefore, a fat that has undergone a refining operation for the removal of such constituents. Normally the interfering constituents will be the phospholipids and free fatty acids which can be effectively removed by appropriate methods. The sterols normally form a true solution with the liquid fatty medium, and when present in a low concentration, such as is normally found in natural fat-containing substances, emulsification problems are negligible. If the natural fat-containing substances are high in sterols, low sterol-containing fats should be used as the solvent fatty medium.

The following are illustrative examples showing more clearly how this invention is practised.

*Example 1.*—Two thousand pounds of finely ground cod livers analysing 40% oil, 45% water and 15% solids are pumped into a kettle of 600 gallons capacity. To this mixture there are added 1000 lbs. of crude cod liver oil (medicinal grade) containing less than 1% solids and water, and the same thoroughly admixed. The mixture may be effectuated while the kettle is subjected to a vacuum of not less than 28½ in. of mercury.

While stirring at approximately 20 revolutions per minute (R. P. M.) and maintaining a suitable steam pressure in the jacket of the kettle so that the temperature of the internal mixture does not exceed 120° F. the dehydration is carried out under the aforesaid vacuum. The water vapor emerging from the kettle is passed through a suitable vapor line and condensed in an outside surface condenser by cooling water. The dehydration operation is completed in about two hours, and the mixture of the liver solids and the oil is allowed to cool by running cool water through the jacket. The vacuum is broken by the introduction of nitrogen, and a sample of the kettle contents is removed. The test sample shows an analysis of less than 1% water, 14.5% liver solids, and 84.5% oil. Since the densities of the oil and liver solids are sharply different, the liver solids will settle to the bottom, and most of the oil may be freely drawn off. This oil is hazy because of its content of phospholipids, and other wax-like components, and can be filtered or separated by appropriate methods. The liver solids (and adherent oil) analyzes 60% oil free solids and 40% oil. The liver solids may be subjected to appropriate extraction of the oil content thereof, and in this way all of the oil removed, the residue thereafter requiring no further grind.

It will be observed that the ratio of solids to other oil in the ultimate mass subjected to the dehydration was 15 parts of solids to 90 parts of total oil.

Example 2

Beef livers having average compositions of fat 5%, of which 60% is phospholipids, solids 25 parts and moisture 70% are macerated. To the macerate in aqueous suspension there are added 150 parts of oil. The same are thoroughly blended with each other, thereby obtaining a mixture in which the ratio of the solids to the total oil is 25 parts solids to 155 parts of oil. This mixture is subjected to dehydration in accordance with the process described in Example 1.

Example 3

Fish entrails having average composition of fat 5%, solids 20% and water 75% are thoroughly ground so as to obtain a slurry. To the slurry there are added 100 parts of oil, thereby obtaining a mixture in which the ratio of solids to the total oil is 20 parts solids to 105 parts of oil. This mixture is subjected to dehydration in accordance with the procedure described in Example 1.

Example 4

A fish slurry having an average composition of 1% fat, 7% solids and 92% of water is subjected to a preliminary drying operation to obtain an intermediate mixture having an average composition of 1 part fat, 7 parts solids and 20 parts of water. To this intermediate mixture there are added 35 parts of oil to obtain a mass having an average composition of 7 parts of solids and 36 parts of oil. The latter mass is then subjected to dehydration in accordance with the general method described in Example 1.

Example 5

Herring bodies are macerated to obtain a slurry having an average composition of 8% oil, 70% water and 22% solids. To the slurry there are added 150 parts of oil, thereby obtaining a mixture in which the ratio of solids to total oil is 22 parts of solids to 158 parts of oil. This is then subjected to dehydration in accordance with the general procedure described in Example 1.

Example 6

The soy beans are ground to obtain a mass having an average composition of 20% fat, 8% moisture and 72% solids. To this mass there are added 400 parts of oil, either soy bean or other appropriate oil, and the same thoroughly mixed. The ratio of solids to total oil in this mixture is 72 parts of solids to 420 parts of total oil. The mixture is subjected to dehydration in accordance with the general procedure described in Example 1.

Example 7

Cotton seeds are mashed to obtain a mass having an average composition of 8½% water, 20% oil and 71½% solids. To the mass there are added 400 parts of oil, either cotton seed or any appropriate oil, and the same thoroughly mixed. The ratio of solids to total oil in this mixture is 71.5 parts of solids to 420 parts of total oil. The mixture is subjected to dehydration in accordance with the general procedure described in Example 1.

Example 8

Peanuts are ground to obtain a mass having an average composition of 48% oil, 3.25% moisture and 48.75% solids. To this mass there are added 200 parts of oil, either peanut oil or any other appropriate oil, and thoroughly incorporated therewith. The resultant mixture is one in which the ratio of solids to total oil is 48.75 parts of solids to 248 parts total oil. The mixture is subjected to dehydration in accordance with the general procedure described in Example 1.

Example 9

Seal livers are macerated to obtain a slurry having a composition of 2% fat, 30% solids and 68% water. To this slurry there are added 150 parts of oil. The mixture has a solids to total oil ratio of 30 parts solids to 152 parts of oil. The mixture is subjected to dehydration in accordance with the general procedure described in Example 1.

Example 10

White whale blubber having a composition of 75% fat, 10% solids and 15% water is subjected directly to dehydration in accordance with the general procedure described in Example 1. In this instance the ratio of solids to oil is 10 to 75, and accordingly there is no need to add oil in order to achieve the preferential ratio of solids to oil as a preliminary step to the dehydration operation.

Example 11

The starting material in this instance is sun-rotted cod livers. This material ordinarily is difficult to dehydrate because of emulsification. Two thousand pounds of the macerate of the sun-rotted livers (finely ground) having a composition of 40% oil, 45% water and 15% solids, are pumped into a steam-jacketed kettle of 600 gallons capacity. Then 1000 lbs. of non-medicinal grade cod liver oil having a free fatty acid content (approximately 15%) and containing less than 1% of solids and water are added to the macerate, and thoroughly admixed therewith. This material is dehydrated in accordance with the general procedure described in Example 1.

Example 12

The starting material in this instance is fluid whole milk having a composition of 4% butter fat, 8% solids. This whole milk is subjected to a preliminary dehydration to obtain an intermediate product having a composition of four parts butter fat, 8 parts solids and 25 parts water (total 37 parts). To the intermediate product there are added 40 parts of butter fat, thereby obtaining a mixture in which the ratio of solids to total fat is 8 parts solids to 44 parts of total fat. This mixture is then subjected to dehydration in accordance with the general procedure described in Example 1. The dehydrated product is then subjected to pressing so as to obtain whole milk solids having a composition of 3 to 4 parts of fat and 8 parts of solids. This ultimate whole milk solids product is far superior in character to the dry whole milk solids heretofore obtainable in commerce.

Example 13

To a mass of finely ground shark livers having a composition of 60 parts of oil, 12 parts of solids and 28 parts of water, there are added 25 parts of oil. The mixture is dehydrated in accordance with the general procedure in Example 1. The dehydrated product has a composition of 80 parts of oil and 12 parts of solids. The solids may be removed from the oil as hereinbefore described.

*Example 14*

To a mass of finely ground tuna livers having a composition of 5 parts of oil, 30 parts of solids and 65 parts of water, there are added 175 parts oil. The mixture is dehydrated in accordance with the general procedure in Example 1. The dehydrated product has a composition of 180 parts of oil and 130 parts of solids. The solids may be removed from the oil as hereinbefore described.

*Example 15*

To a mass of finely ground halibut livers having a composition of 20 parts of oil, 30 parts of solids and 50 parts of water, there are added 150 parts oil. The mixture is dehydrated in accordance with the general procedure in Example 1. The dehydrated product has a composition of 170 parts of oil and 30 parts of solids. The solids may be removed from the oil as hereinbefore described.

*Example 16*

The starting material in this instance is cod livers. They are finely ground to obtain a macerate which has the following composition: 39.5% fat, 0.5% lecithin, 45% water and 15% solids. To 100 parts of this macerate there are added 50 parts of lecithin-free oil, and the mixture dehydrated in accordance with the general procedure described in Example 1 to obtain a dehydrated mixture of 15 parts of solids and 90 parts of fat (0.5 part of which is lecithin). The dehydrated mixture is then subjected to screw pressing so as to obtain a residue of the solids with fat adhering thereto, the composition of which is: 15 parts of solids and 7 parts of fat (0.039 part of which is lecithin). To 22 parts of that mixture there are added 75 parts of lecithin-free fat, and the fat directly admixed so as to obtain a further mixture which has a composition of: 15 parts of solids and 82 parts of fats (0.039 part of which is lecithin). This last mixture is then screw pressed to obtain the solids (with some adherent oil) virtually free of lecithin.

By procedure similar to that hereinbefore described there is obtained dehydrated oil derived from the sardine, the menhaden, and other fats and oils of animal origin and likewise dehydrated oils of vegetable origin such as wheat germ, corn germ, and others.

It will be noted that the process hereinbefore described makes it possible readily to dehydrate fats and oils under conditions whereby the valuable concomitants of the oil are preserved during the dehydration. Additionally it will be noted that the maintenance of the mixture undergoing dehydration in the fluid state results in very substantial economy in power consumption. Additionally, there is avoided the danger of destructive effects of high temperatures on the solid materials which occurs when the original mass is subjected directly to dehydration.

As shown above the amount of oil to be added in most instances of batch operations is such as to achieve a mixture in which the ratio of total fat to solids is in the range of from 5 to 8:1. For continuous operations where greater fluidity of the mixture is required than is needed in the case of batch operations, the ratio may be as high as 20 to 1, and where the materials being processed are particularly viscous, the ratio will be even greater than 20 to 1 in order to achieve desired fluidity or limpidity.

As used in the foregoing specification and in the appended claims the words "fats," "fatty," and the like refer to the natural glycerides, the free fatty acids thereof, and includes as well the unsaponifiable lipoid soluble concomitants of the natural fats and oils, such as the oil soluble vitamins, sterols, phospholipids, and other naturally occurring lipoid solubles.

It will be understood that the foregoing examples are illustrative of the manner of practising this invention; and accordingly, the appended claims are to be construed as defining the invention within the full scope thereof.

I claim:

1. A process of dehydrating a mass of finely ground non-fat solids, fats, and water, which comprises adding to said mass an oil whereby the oil content of the said mass is increased to form a liquid mixture in which the ratio of the total fat to non-fat solids is at least two parts of fat to one part of non-fat solids, and heating the said liquid mixture at subatmospheric pressure and removing the water therefrom in the vapor state, whereby a liquid residue is obtained consisting essentially of substantially dehydrated solids and fats, and then separating the said solids from the fats thereby to obtain a separate fraction of substantially dehydrated non-fat solids.

2. A process of dehydrating a mass of finely ground non-fat solids, fats and water, which comprises adding to said mass an oil whereby there is obtained a liquid mixture having a composition in which the ratio of the solids to the total of the fats is from 2 to 20 parts of fat total to 1 part of solids, and heating the aforesaid liquid mixture at subatmospheric pressure and removing water therefrom in the vapor state, whereby a liquid residue is obtained consisting essentially of the aforesaid dehydrated solids and fats, and then separating the said solids from the fats thereby to obtain a separate fraction of dehydrated fat and a separate fraction of dehydrated non-fat solids.

3. A process in accordance with claim 2 wherein the ratio of the total fats to the non-fat solids in the liquid mixture is 5 to 8 parts of fat total to 1 part of solids.

4. A process in accordance with claim 2 wherein the subatmospheric pressure is approximately a reduction of 28 inches of mercury.

5. A process in accordance with claim 2 wherein the ratio of the total fats to the non-fat solids in the liquid mixture is 5 to 8 parts of said total to 1 part of solids, and the subatmospheric pressure is approximately a reduction of 28 inches of mercury.

6. A process of treating cod livers which comprises grinding said livers to obtain a slurry of finely divided liver solids, cod liver oil, and water, mixing said slurry with oil to obtain a mixture in which the ratio of solids to total fat is approximately 5 to 8 parts of fat total to 1 part of solids, and subjecting said mixture to a temperature not substantially in excess of 120° F. under vacuum whereby the water is driven off in the vapor state to obtain a water-free residue of fats and solids, and then separating the said fats from the solids.

7. A process of treating materials of natural origin consisting essentially of non-fat solids, fat, and water, which comprises preparing a slurry of said mixture of materials with the solids thereof in finely divided state, adding to said slurry an oil to obtain a second mixture in which the ratio of total fat to non-fat solids is at least two parts of fat to one part of non-fat solids, heating said second mixture at subatmospheric pressure and removing water therefrom in the vapor state, whereby a liquid residue is obtained consisting essentially of the aforesaid substantially dehydrated solids and fats, and then separating the said solids from the fats to obtain a separate fraction of dehydrated fat and a separate fraction of substantially dehydrated non-fat solids.

8. A process of treating materials of natural origin consisting essentially of non-fat solids, fat, and water, which comprises preliminarily partially dehydrating said materials, taking said mixture of partially dehydrated materials and adding thereto an oil to obtain a second liquid mixture in which the ratio of solids to total fat is from 2 to 20 parts of total fat to 1 part of solids, and heating the aforesaid liquid mixture at subatmospheric pressure and removing water therefrom in the vapor state, thereby to obtain a substantially dehydrated mixture, and pressing the said substantially dehydrated mixture to obtain a press residue of non-fat solids containing fat having a ratio of 3 to 4 parts of fat to 8 parts of solids non-fat.

9. A process of treating materials of natural origin consisting essentially of non-fat solids, fatty emulsion-creating substances, fat, and water, which comprises preparing a slurry of said mixture of materials with the solids thereof in finely divided state, adding to said slurry an oil to obtain a second mixture of increased oil content, and heating said second mixture at subatmospheric pressure and removing water therefrom in the vapor state, thereby obtaining a substantially water-free liquid residue of solids and oil containing said fatty emulsion-creating substances, and separating the solids from said residue, thereby obtaining a separate fraction of a substantially water-free oil containing fatty emulsion-creating substances, and a separate fraction of water-free solids.

10. A process of separating non-fat solids free of emulsion-creating substances from a starting material consisting essentially of fats, non-fat solids, emulsion-creating substances and water which comprises, dehydrating said starting materials, separating the fats from the non-fat solids in said dehydrated material thereby to obtain a residue of non-fat solids with adherent emulsion-creating substances and fat, mixing said residue with an oil that is substantially free of emulsion-creating substances whereby the emulsion-creating substances are transferred to the oil, and then separating the oil which now contains the emulsion-creating substances from the non-fat solids thereby to obtain a final residue of non-fat solids substantially free of emulsion-creating substances.

11. A process of dehydrating ground seed meats, said ground material consisting of fats, non-fat solids, and water, which comprises adding thereto an oil to form a liquid mixture of fats, non-fat solids, and water, in which the ratio of the total fats to the said solids is at least two parts of fat to one part of non-fat solids, and heating said liquid mixture at subatmospheric pressure and removing the water therefrom in the vapor state, whereby a substantially dehydrated liquid residue of the aforesaid solids and fats is obtained, and then separating the said solids from the fats thereby to obtain a separate fraction of dehydrated fat and a separate fraction of substantially dehydrated non-fat solids.

CHARLES GREENFIELD.

References Cited in the file of this patent

UNITED STATES PATENTS

| Number | Name | Date |
|---|---|---|
| 2,282,795 | Musher | May 12, 1942 |
| 2,289,780 | Hickman | July 14, 1942 |

OTHER REFERENCES

"Cottonseed and Cottonseed Products," edited by Alton E. Bailey, 1948, pub. by Interscience Publishers Inc., New York, pages 641 to 643.